Patented Aug. 10, 1954

2,686,204

UNITED STATES PATENT OFFICE 2,686,204

POLYKETONES

Roger W. Watson, Chicago, Ill., and Lawson W. Mixon, Hammond, Ind., assignors to Standard Oil Company, Chicago, Ill., a corporation of Indiana No Drawing. Application June 3, 1949, Serial No. 97,101

11 Claims. (Cl. 260—593)

This invention relates to novel polyketone condensation products and methods of preparing same. More particularly it relates to the preparation of these polyketones by condensation of monocarboxylic acids with alpha, omega polymethylene dicarboxylic acids.

The polyketones of this invention vary substantially in physical properties, depending upon the initial reactants employed, but over a very wide range the products obtained are of a wax-like nature. It is to these useful wax-like products that this invention is particularly directed.

It has long been observed that the vast majority of natural waxes are composed substantially of long-chain acyclic organic radicals, and depending upon the length of these chains, and the number and type of functional groups linking the chains, each wax has distinctive properties which serve to differentiate it from the many others. A major percentage of Japan wax comprises the tripalmitic acid ester of glycerin. Carnauba wax comprises, for the most part, esters derived from high-molecular-weight normal aliphatic primary alcohols and normal aliphatic acids as well as a substantial proportion of the free acids and alcohols. Beeswax comprises substantially cerolein, cerotic acid, myricyl alcohol and melissic acid. Investigation of other natural waxes serves only to extend the analogy and to bear out the fact that the naturally occurring waxes comprise for the most part organic compounds of a substantially linear nature.

It is known that monocarboxylic acids will react in the presence of certain catalysts to produce monoketones of a somewhat wax-like nature. Stearic acid, for example, yields stearone which melts at approximately the melting point of carnauba wax. This material, despite its wax-like character compares unfavorably with carnauba wax in those physical characteristics which are responsible for the excellence of carnauba as a polishing wax. The reaction of various dicarboxylic acids to produce ketones has been disclosed in the literature and patent art, but the products have almost entirely been cyclic compounds having comparatively low melting points and few, if any, wax-like features.

It is an object of this invention to prepare polyketone condensation products. A further object is to prepare these condensation products from a reaction mixture containing monocarboxylic acids and alpha, omega polymethylene dicarboxylic acids. An additional object of this invention is to prepare polyketones having wax-like properties which are particularly characterized by their hardness, high melting point, and ability to impart a high and lasting luster. Another object is to prepare novel synthetic waxes which may be employed as substitutes or extenders for natural waxes such as carnauba wax and the like. These and other objects of our invention and its advantages over the prior art will become increasinly apparent from the description hereinafter set forth.

We have discovered that certain mixtures of acyclic monocarboxylic acids and alpha, omega polymethylene dicarboxylic acids can be reacted to yield polyketone waxes having physical characteristics surprisingly similar to carnauba wax. Among these characteristics are hardness, homogeneity of texture, slight brittleness and particularly an ability to produce and maintain a high polish. The polyketones produced in accordance with the present invention are such as allow substitution for carnauba wax or other natural waxes and in many cases prove to be superior to the natural waxes.

When an acyclic monocarboxylic acid and an alpha, omega polymethylene dicarboxylic acid are condensed according to our invention, the following general reaction predominates:

(1) $2RCOOH + y(CH_2)_x(COOH)_2 \rightarrow$
    $RCO[(CH_2)_xCO]_yR + (y+1)CO_2 + (y+1)H_2O$

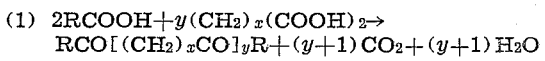

wherein R represents an acyclic hydrocarbon radical, $x$ is at least 3, and preferably an integer from 3 to 26, and $y$ is an integer from 2 to 20.

The process of this invention can be applied to monocarboxylic acids and alpha, omega polymethylene dicarboxylic acids in general as well as to certain derivatives hereinafter set forth. The monocarboxylic acids particularly suitable for use in preparation of these synthetic waxes have the general formula RCOOH wherein R represents an acyclic hydrocarbon radical having from one to thirty carbon atoms. The dicarboxylic acids which are preferred for this synthesis have a general formula $(CH_2)_x(COOH)_2$, wherein $x$ is at least 3, and preferably an integer from 3 to 26. Obviously the particular product obtained in any one reaction depends to a great extent upon the acid reactants employed. While our invention is not limited to the use of substantially normal acyclic monocarboxylic acids, it has been found that particularly satisfactory high-melting-point waxes are prepared when such acids are employed.

Among the many possible acyclic monocarboxylic acids which are suitable for the preparation of our novel waxes the following are a few examples: acetic, propionic, isobutyric, butyric, valeric, pelargonic, lauric, palmitic, stearic behenic, lignoceric, arachidic, oleic, cerotic, ricinoleic, cetoleic, palmitoleic, methyl levulinic, etc.

Among the many alpha, omega polymethylene dicarboxylic acids which may be employed in this synthesis, the following may be named: glutaric, adipic, pimelic, sebacic, suberic, japanic, azelaic.

We prefer to prepare our polyketones in the presence of a substance known to facilitate the formation of ketones from carboxylic acids by the splitting of carbon dioxide. Such substances are metals such as iron, cobalt, nickel and like base heavy metals which appear above hydrogen in the electro-chemical series, the rare earths, or oxides, mixtures, compounds or alloys thereof. In particular, such oxides as calcium oxide, barium oxide or strontium oxides, manganese oxides, chromium oxides, titanium oxide, zinc oxide, aluminum oxide or thorium oxide or mixtures or compounds thereof are particularly suited for this synthesis.

While we have found that our novel waxes can best be prepared by carrying out the reaction in the presence of a substance capable of facilitating the splitting of carbon dioxide from an organic acid it should be understood that we are not limited to that method of operation. Thus, in addition, to the catalytic preparation of the polyketones, it is possible, for example, to obtain polyketones by heating metal salts of the acids up to the reaction temperatures hereinafter set forth either with or without added catalyst. After extraction with a suitable solvent, such as methyl ethyl ketone, dioxane, petroleum naphtha, dibutyl ketone, amyl alcohol, dibutyl ether, or the like, the reaction product may be contacted with semicarbazide following which the semicarbazone is crystallized from alcohol. By treatment of the semicarbazone with acid, the polyketone can be regenerated. Suitable reagents other than semi-carbazide, such as hydroxylamine, phenylhydrazine and the like, or active methylene compounds such as malonic ester, can of course be employed to isolate the polyketones. Many derivatives of the polyketones with the ketone reagents may also be employed in some cases as waxes. The salts of metals appearing above hydrogen in the electrochemical series and the rare earths are suitable for use in this method of preparation. These salts may be represented by the formula $RCOOZ$ and $(CH_2)_xCOOZ$ wherein R is an acyclic radical, $x$ is an integer from 3 to 26 and Z is a substituent selected from the group consisting of the metals above hydrogen in the electro-chemical series and the rare earth metals.

In general, whether the ketones are formed from the salts or from the acids, in the presence of a substance capable of facilitating the formation of ketones, the reaction is generally referred to as one of decarboxylation which term, as employed herein and in the accompanying claims, means the reaction in which a ketone is formed by the condensation of carboxylic acids or their salts with a splitting out and release of carbon dioxide under conditions known to those skilled in the art, said conditions being hereinbefore and hereinafter set forth.

Suitable temperatures for the reaction are between about 250° F. and 800° F. Usually it is found desirable to operate within the range of from about 390° F. to about 690° F., depending upon the reactants employed.

While the reaction will proceed readily at atmospheric pressure with normally liquid reactants, it may be desirable for ease of operation when working with certain of the heavier acids, or conversely the lower molecular weight acids, to operate under a moderate vacuum or at an elevated pressure as the particular acids used might require. In general, it may be said that pressures from as low as about 10 millimeters' mercury absolute up to about 100 atmospheres are suitable for preparing our synthetic waxes.

Sufficient time is allowed to obtain the desired amount of conversion; the reaction ordinarily being completed when the evolution of carbon dioxide subsides.

The wax-like products obtainable according to this invention may be employed either alone or together with other waxes or wax-like substances of either natural or synthetic origin. Those novel products of our invention having a melting point above about 175° F. are particularly suited for use in the preparation of various polishing compositions, such as those which are employed in dressings for shoes, furniture, automobiles and the like. Because the waxes of our invention have such a high degree of hardness and elevated melting point, they are especially suitable for use in those situations where stability is a necessary factor, as, for example, when they are molded.

While we have described our invention particularly with respect of the reaction of one monocarboxylic acid with one dicarboxylic acid, it should be understood that more than one of each may be present in the reaction mixture. For example, the reaction may be carried out with a mixture containing sebacic acid and adipic acid, as the dicarboxylic acids, and pelarganic acid as the monocarboxylic acid; on the other hand, there may be two or more monocarboxylic and two or more dicarboxylic acids in the reaction mixture without departing from the scope of our invention.

The molecular weight of the polyketone products depends substantially upon two factors. The first is the ratio of monocarboxylic acid to dicarboxylic acid initially employed and the second, to a somewhat lesser extent, is the molecular weight of the initial reactants. Thus, polyketones varying in consistency, molecular weight, oxygen content, hardness, etc. may be prepared by variation of either or both the molecular weight of the acids and their relative proportions in the reaction mixture.

Polyketones having greatly different molecular weights and physical properties may be obtained by variation of the ratio of dicarboxylic acid to monocarboxylic acid as well as variation of the acids employed. Excellent yields of useful waxes may be obtained by employing dicarboxylic acids having from about five to about fifteen carbon atoms in ratios of from about 2:1 to about 20:1 with respect of the monocarboxylic acid present in the reaction mixture; with dicarboxylic acids having from about sixteen to about twenty-eight carbon atoms, this ratio may be somewhat less, for example, from about 2:1 to about 10:1.

The order of combining the reactants and catalysts, if a catalyst is used, will depend upon the particular starting materials employed. It is ordinarily satisfactory to combine the catalyst and reactants simultaneously in the reactor. In one modification, the acid reactants may be preheated to substantially reaction temperature and passed into contact with a body of catalyst in the reactor; alternately the dicarboxylic acid may be heated to reaction temperature in the presence of the catalyst and then the monocarboxylic acid may be passed in, at the same time vigorously agitating the reaction mixture. Variations in the order of addition of the reagents and catalyst can readily be worked out to best suit particular cases.

The following examples will further illustrate how this invention may be carried out in practice, but the invention is not restricted to these examples.

*Example I*

1.5 moles of sebacic acid and .5 mole of lauric acid were heated in an open retort at a temperature in the range of from about 680° F. to 715° F. in the presence of 100 grams of powdered iron. The reaction temperature was maintained for approximately three hours, and the mixture was stirred continuously during that time. At the end of about three hours the evolution of carbon dioxide had substantially completely subsided. The product mass was extracted with methyl ethyl ketone from which a hard wax-like material melting at 225° F. was obtained.

*Example II*

Under conditions substantially as described above in Example I, 1.5 moles of sebacic acid, .375 mole of stearic acid and 100 grams of iron were reacted for two and a half hours. After carbon dioxide evolution had subsided, the resulting product mass was extracted with methyl ethyl ketone and recrystallized several times. The hard, brittle, wax-like substance obtained had a melting point of approximately 230° F.

*Example III*

.15 mole of adipic acid, .1 mole of stearic acid and 13.9 grams of powdered iron were heated together in a flask with vigorous stirring. At about 400° F. the iron powder dissolved with the evolution of gas and again became quiescent. At about 500° F. decarboxylation began with the evolution of carbon dioxide. The evolution of gas subsided after about two hours and with the temperature at about 575° F. The product was dissolved in naphtha, filtered through cellite to remove the black residue of iron oxide (or carbonate) and recrystallized. The product was a wax melting at approximately 170° F.

*Example IV*

.34 mole of stearic acid, .5 mole of adipic acid, .5 mole of sebacic acid were melted together. 53 grams of powdered iron were then added and the reaction proceeded in the manner described above in Example III. The resulting hard wax melted at approximately 210° F.

*Example V*

Under conditions substantially as described above in Example I, 1 mole of stearic acid and 1.5 moles of sebacic acid were decarboxylated in the presence of iron catalyst to give an ultimate wax, after recrystallization from methyl ethyl ketone, having a melting point of 200° F.

*Example VI*

Under conditions substantially as described above in Example I, 1 mole of stearic acid, 2 moles of adipic acid and 2 moles of sebacic acid were decarboxylated in the presence of iron catalyst to yield a wax after recrystallization from methyl ethyl ketone, having a melting point in the range of about 231° F. to 237° F.

Having thus described the invention, what is claimed as new and desired to be secured by Letters Patent is defined by the following claims.

We claim:

1. A process for producing polyketones which consists essentially in decarboxylating and ketonizing, at a temperature in the range of from about 250° F. to about 800° F., a mixture comprising at least one initially added compound having the general formula RCOOZ and at least one compound having the general formula $$(CH_2)_x(COOZ)_2$$

wherein R represents an alkyl hydrocarbon radical, $x$ is an integer from 3 to 26 inclusive and Z is a substituent selected from the group consisting of hydrogen, the metals above hydrogen in the electro-chemical series and the rare earth metals, and recovering a reaction product melting in the range of from about 120° F. to about 300° F.

2. A process for the preparation of polyketones which comprises reacting at a temperature in the range of from about 250° F. to about 800° F., a mixture containing at least one initially added alkyl monocarboxylic acid and at least one alpha, omega polymethylene dicarboxylic acid in the presence of a ketonizing decarboxylation catalyst and recovering a reaction product melting in the range from about 120° F. to about 300° F.

3. A process for the preparation of a polishing wax which comprises reacting, at a temperature in the range of from about 250° F. to about 800° F., a mixture containing at least one initially added compound having the general formula RCOOH and at least one compound having the general formula $(CH_2)_x(COOH)_2$ wherein R represents an alkyl hydrocarbon radical, and $x$ is an integer from 3 to 26 inclusive, said reaction being carried out in the presence of a ketonizing decarboxylation catalyst.

4. The process of claim 3 wherein the ketonizing decarboxylation catalyst is iron.

5. A process for the preparation of polyketones which comprises reacting at a temperature in the range of from about 250° F. to about 800° F., a mixture containing at least one initially added metal salt of an alkyl monocarboxylic acid and a metal salt of an alpha, omega polymethylene dicarboxylic acid, the metal constituent of said salts being above hydrogen in the electro-chemical series, and recovering a reaction product melting in the range from about 120° F. to about 300° F.

6. A process for the preparation of polyketones which comprises reacting at a temperature in the range of from about 250° F. to about 800° F., a mixture containing at least one initially added metal salt of an alkyl monocarboxylic acid and a metal salt of an alpha, omega polymethylene dicarboxylic acid, the metal constituent of said salts being a rare earth metal, and recovering a reaction product melting in the range from about 120° F. to about 300° F.

7. A process which comprises reacting, at a temperature in the range of from about 250° F. to about 800° F., stearic acid with sebacic acid in the presence of a ketonizing decarboxylation catalyst and recovering a reaction product melting in the range of from 120° F. to about 300° F.

8. A process which comprises reacting, at a temperature in the range of from about 250° F. to about 800° F., lauric acid with sebacic acid in the presence of a ketonizing decarboxylation catalyst and recovering a reaction product melting in the range of from 120° F. to about 300° F.

9. A process which comprises reacting, at a temperature in the range of from about 250° F. to about 800° F., stearic acid with adipic acid in the presence of a ketonizing decarboxylation catalyst and recovering a reaction product melting in the range of from 120° F. to about 300° F.

10. A process which comprises reacting, at a temperature in the range of from about 250° F. to about 800° F., stearic acid with azelaic acid in the presence of a ketonizing decarboxylation catalyst and recovering a reaction product melting in the range of from 120° F. to about 300° F.

11. A synthetic polishing wax consisting essentially of polyketones having the general formula:

$$CH_3(CH_2)_{16}CO[(CH_2)_4CO]_y(CH_2)_{16}CH_3$$

wherein $y$ is an integer from 2 to 20 inclusive.

References Cited in the file of this patent

UNITED STATES PATENTS

| Number | Name | Date |
|---|---|---|
| 1,941,640 | Tressler | Jan. 2, 1934 |
| 1,988,021 | Schmidt et al. | Jan. 15, 1935 |

OTHER REFERENCES

Harries: "Annalen," vol. 406 (1914), pages 208–217.

Beilstein: "Handbuch der Organischen Chemie," vol. I, First Supplement, page 414 (1928), Berlin.

Vogel: J. Chem. Soc., 1929 volume, pages 721–733, 1928 volume, pages 2032–2035.